Figure 1:
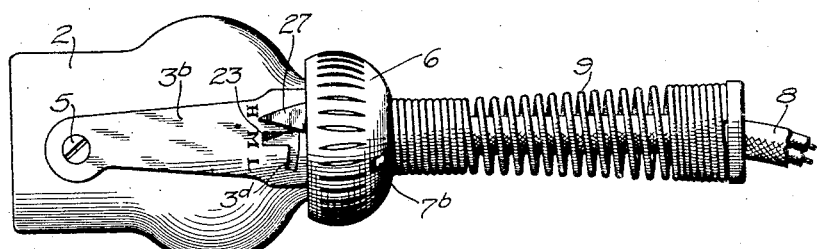

March 8, 1927.

M. C. BERSTED 1,620,184

AUTOMATIC ELECTRIC CONNECTION PLUG FOR ELECTRIC HEATING APPARATUS

Filed April 18, 1923    3 Sheets-Sheet 1

INVENTOR.
MARTIN C. BERSTED.
BY A.B.Bowman
ATTORNEY

March 8, 1927. 1,620,184
M. C. BERSTED
AUTOMATIC ELECTRIC CONNECTION PLUG FOR ELECTRIC HEATING APPARATUS
Filed April 18, 1923 3 Sheets-Sheet 2

INVENTOR.
MARTIN C. BERSTED.
BY A.B.Bowman
ATTORNEY

March 8, 1927.

M. C. BERSTED 1,620,184

AUTOMATIC ELECTRIC CONNECTION PLUG FOR ELECTRIC HEATING APPARATUS

Filed April 18, 1923        3 Sheets-Sheet 3

Inventor
MARTIN C. BERSTED

By A. B. Bowman

Attorney

Patented Mar. 8, 1927.

1,620,184

UNITED STATES PATENT OFFICE.

MARTIN C. BERSTED, OF SAN DIEGO, CALIFORNIA.

AUTOMATIC ELECTRIC CONNECTION PLUG FOR ELECTRIC HEATING APPARATUS.

Application filed April 18, 1923. Serial No. 632,365.

My invention relates to automatic electric connection plugs for electric heating apparatus, and the objects of my invention are: first, to provide an electric plug of this class for connecting an electric heating apparatus with a source of electrical energy, by reason of which the electrical energy to the heating elements of the apparatus will be shut off when the heat thereof reaches a certain predetermined high temperature and will be automatically turned on when a certain low temperature is reached; second, to provide an automatic plug of this class which is applicable to the different electric heating apparatus now in use; third, to provide an electric plug of this class which is connected with the heating apparatus contiguous to the heating elements thereof, so that the plug connecting the same with a source of electrical energy will be heated relatively, and a certain high and low temperature of the plug will be proportional to a certain high and low temperature of the heating apparatus; fourth, to provide an electric plug of this class in which the heat will not be as intense as in the heating apparatus, thereby providing more economical construction of the heat regulating means; fifth, to provide an electric plug of this class in which the high and low temperatures of the heating apparatus may be manually changed to suit conditions as desired; sixth, to provide an electric plug of this class by reason of which it will not be necessary to provide heat regulating means on electric heating apparatus, but in which the regulation of heat may be efficiently taken care of by a single heat regulating means with my automatic electric plug; seventh, to provide a novelly constructed electric plug of this class, and eighth, to provide an electric connection plug of this class which is very simple and economical of construction, durable, efficient, compact, and which will not readily deteriorate or get out of order.

Figure 2:
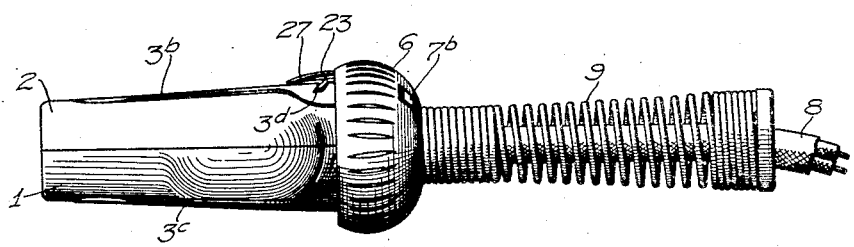
Figure 3:
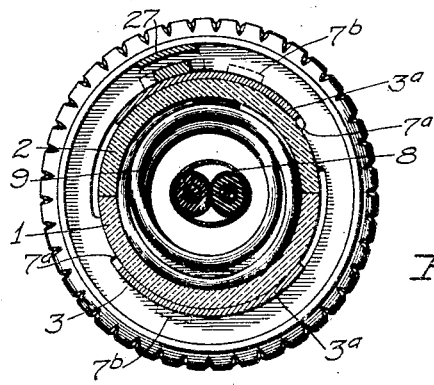
Figure 4:
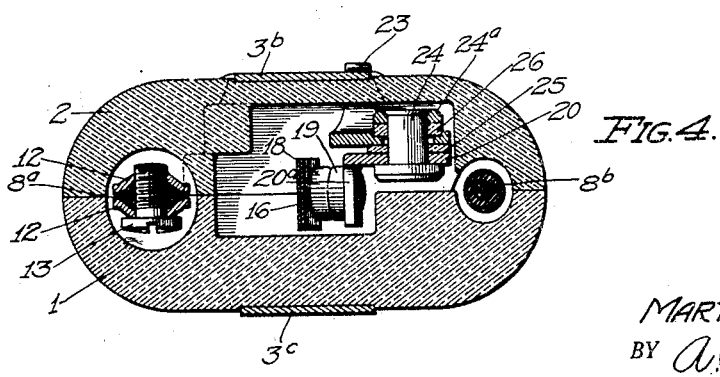
Figure 5:
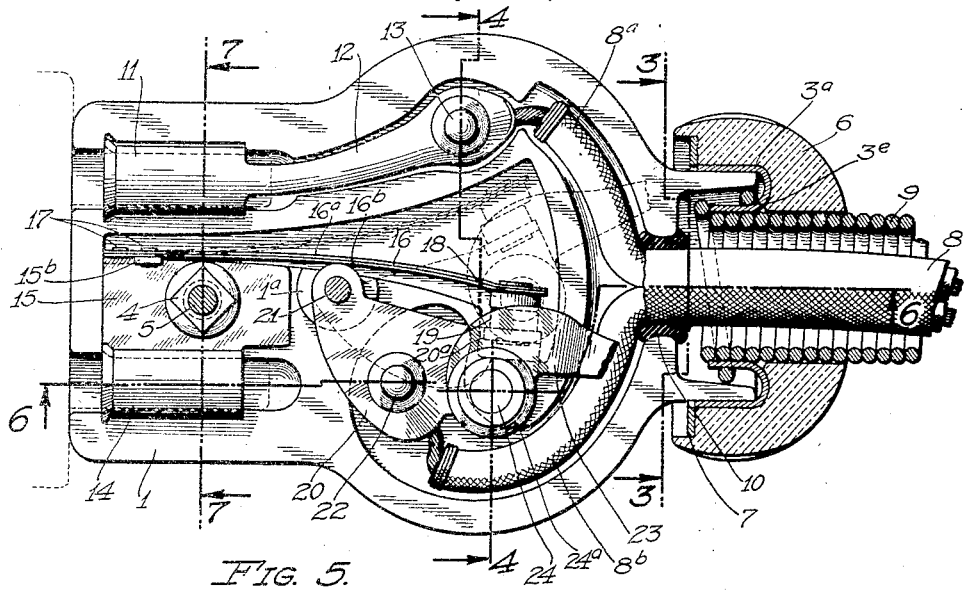
Figure 6:
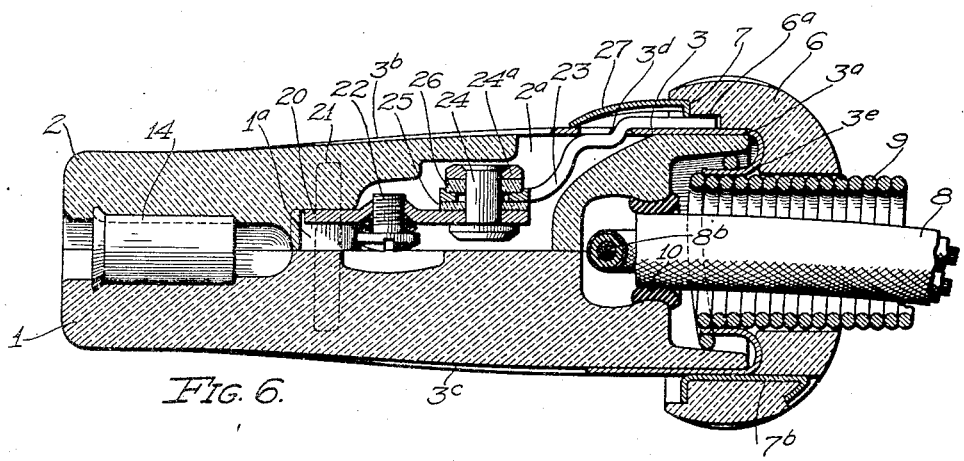
Figure 7:
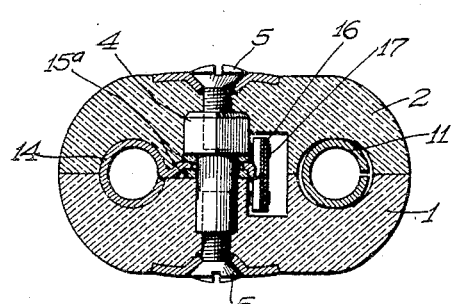
Figure 8:
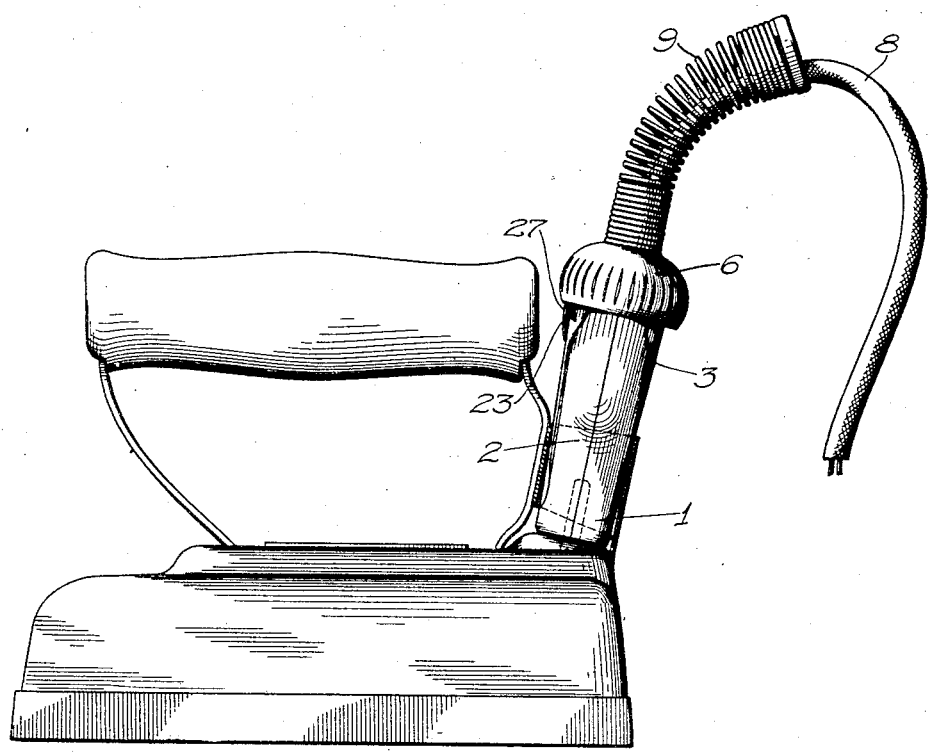

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side view of my electric connection plug connected to one end of an electric cord; Fig. 2 is another side view thereof at a right angle thereto, showing the narrow side of the plug; Fig. 3 is a transverse, sectional view of said plug, taken through 3—3 of Fig. 5; Fig. 4 is another transverse, sectional view thereof, taken through 4—4 of Fig. 5; Fig. 5 is a view taken through the middle portion of the plug, showing the inside of one side thereof on an enlarged scale and showing by dotted lines a shifted position of the contact members; Fig. 6 is a longitudinal, sectional view thereof, taken through 6—6 of Fig. 5; Fig. 7 is another transverse, sectional view thereof, taken through 7—7 of Fig. 5, and Fig. 8 is an elevational view of an electric flat iron, showing my automatic electric connection plug connected to the terminals of the iron and showing certain portions of the iron broken away and in section to facilitate the illustration.

Like characters of reference refer to similar parts and portions throughout the several views of the drawings.

The casing members 1 and 2, frame member 3, socket bolt 4, screws 5, knob 6, annular retaining member 7, electric cord 8, spring 9, resilient collar 10, socket member 11, arms 12, screw 13, socket member 14, plate 15, thermostat member 16, rivets 17, contact members 18 and 19, contact supporting member 20, pivot member 21, screw 22, contact shifting member 23, rivet 24, insulating washers 25 and 26, and the indicating member 27, constitute the principal parts and portions of my automatic electric connection plug.

The casing members 1 and 2, made of hard rubber or other similar insulating material, are secured together at the end into which the cord extends by means of the annular portion 3ª of the frame member 3. The frame member 3 is provided with a pair of arms 3ᵇ and 3ᶜ, extending from the head end to near the free ends of the casing members, and are secured together at said extended ends by the screws 5 and the socket bolt member 4, said bolt member being positioned in recesses between said casing members, one end of which member is square to prevent the turning of said member within said casing members, into the ends of which are secured the screws 5, which serve as a lock with each other. At the head end of said casing members and said frame member is provided a knob 6, revolubly mounted thereon, and retained in said position by means of the annular retaining member 7, positioned in an annular recess on the plug side of said knob. Said retaining member 7 is provided with inwardly extending lugs 7ª, which engage the annular portion of said frame member and prevent said retaining member from being drawn outwardly. Said member 7 is also provided with longitudinally extending lugs 7ᵇ, which extend through the knob 6 and are adapted to be turned over at their extended ends, thus assembling the frame member 3, the knob 6 and the retaining member 7 relatively to each other. The electric cable 8 extends through the knob 6 and the head portion of the casing members; one conductor thereof being directed to each side of said casing members, one of which is connected to the arms 12 by means of the screw 13, the arms 12 being preferably made an integral part of the socket member 11. The socket members 11 and 14 are positioned in recesses between the casing members and are adapted to be connected to the terminal posts of the heating apparatus, which terminal posts are adapted to extend through the openings in the free ends of said casing members and into the socket members 11 and 14, substantially as shown by dotted lines in Fig. 5 of the drawings. The socket member 11 is positioned in an enlarged recess between said casing members so that the same will yield to take care of any slight variation in the spacing of the terminal posts. Said socket members 11 and 14 are also split longitudinally so as to frictionally and resiliently engage the terminal posts and are also beveled at their outer ends to permit the ready insertion of the terminal posts into said socket members. To the socket member 14 is secured a plate 15, which is adapted to secure said socket member in a fixed position, the socket bolt member 4 extending therethrough and is insulated therefrom by means of insulating washers 15ª, positioned above and below the same, and positioning the socket bolt member centrally in the hole provided therein. Said plate 15 is provided at the side opposite the socket member 14 with laterally extending lugs 15ᵇ to which is secured the one end of the thermostat plate 16 by means of the rivets 17. The thermostat member 16 consists of two plates of metal 16ª and 16ᵇ of different coefficients of expansion, so that when the thermostat member is subjected to heat the same will be warped. At the free end of the thermostat member 16 is secured a breaker point or contact member 18, which is adapted to engage the contact member 19, secured to an extended lug 20ª of the contact member support 20, said contact members being preferably made from pure silver. The contact member support 20 is pivotally mounted between the casing members 1 and 2 on the pivot member 21, extending into both of said casing members, the pivotal portion of said contact member support bearing against the bottom of the recess in the casing member 2 and against a boss 1ª, extending beyond the face of the other of said casing members. The other conductor 8ᵇ of the electric cord 8 is electrically connected to the contact member support 20 by means of the screw 22. It will be noted that the connecting portions of the members 12 and 20 with the electric conductors 8ª and 8ᵇ are slightly offset contiguous to the securing screws, providing annular channels for said conductors, in which the ends of said conductors are rigidly secured by the securing screws 13 and 22. Secured to the contact member support 20 is the adjusting lever 23 by means of the rivet 24 and washer 24ª, and is also insulated therefrom by means of the insulating washers 25 and 26, the former being positioned between said members and the latter being positioned in the counter-bored recess of the lever 23 for positioning said lever over the rivet 24 and insulating the same from the rivet and washer 24ª. The end of the adjusting lever 23 extends through a recess 2ª in the side wall of the casing member 2, through a transversely extending slot 3ᵈ in the arm 3ᵇ of the frame member 3, then through a slot in the annular retaining member 7 into an enlarged recess 6ª in the knob 6. It will be noted that the transversely positioned slot 3ᵈ in the frame member 3 is provided with a central slot at a right angle thereto to permit the introduction of the end of said adjusting lever through the arm of said frame member 3, as shown best in Figs. 1 and 6 of the drawings. To the annular retaining member 7 is secured an indicating finger 27, which is preferably positioned over the outwardly projecting portion of the adjusting arm 23 and extends forwardly from the knob 6 towards the free end of the casing members. Transversely positioned on the arm 3ᵇ of the frame member 3 at the end of the indicating finger 27 are the letters, "H", "M" and "L", indicating respectively, "high", "medium" and "low" temperatures, to indicate the positions at which the indicating finger 27, and also the adjusting lever 23 and contact member 19 are to be set to adjust the same for maximum relative temperatures of the plug and therefore of the heating apparatus to which it is connected.

It will be noted that the spring guard 9, through which the cord 8 extends, extends through the middle portion of the knob 6 and the inwardly turned, annular flange portion 3° of the frame member 3, fitting snugly in the latter, and is bent around the inner end of the flange portion thereof, thereby rigidly securing the same to said frame member, as shown in Figs. 5 and 6 of the drawings.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

It is obvious from this construction that there is provided an electric plug for connecting an electric heating apparatus with a source of electrical energy by reason of which the electrical energy to the heating elements of the apparatus will be shut off when the heat thereof reaches a certain predetermined high temperature, and will be automatically turned on when a certain low temperature is reached; that there is provided an automatic electric plug of this class which is applicable to electric heating apparatus now in use for controlling the heat of the same; that there is provided an electric plug of this class which is adapted to be so connected to an electric heating apparatus that the same will be heated relatively to the heating apparatus by conduction, and a certain high and low temperature of the plug will be proportional to certain high and low temperatures of the heating apparatus; that there is provided an electric plug of this class in which the heat will not be as intense as in the heating apparatus, thereby providing for more economical construction of the heat regulating means of the plug; that there is provided a plug of this class in which the high and low temperatures of the plug, and therefore of the heating apparatus to which it is connected, may be manually changed to suit conditions as desired; that there is provided an electric plug of this class by reason of which heat regulating and adjusting means will be eliminated on electric heating apparatus, and in which the regulation of heat will be efficiently taken care of by means of a single heat regulating means of my automatic electric plug; that there is provided a novelly constructed electric plug of this class, and an electric plug which is very simple and economical of construction, durable, efficient, compact, and which will not readily deteriorate or get out of order.

Having thus described my invention, what I claim as new and desire to secure by Letters Patent, is:

1. In an automatic electric plug, a casing, a thermostat member adapted to be warped by heat, positioned in said casing and provided with a contact member near one end thereof, a contact member support pivotally mounted in said casing and provided with a contact member adapted to engage the contact member of said thermostat member, an adjusting lever secured to said contact member support and extending through said casing, and a relative-temperature indicating finger positioned on the outside of said casing and shiftable with the end of said adjusting lever.

2. In an automatic electric plug, a casing, a thermostat member adapted to be warped by heat, positioned in said casing and provided with a contact member near one end thereof, a contact member support pivotally mounted in said casing and provided with a contact member adapted to engage the contact member of said thermostat member, and adjusting lever secured to said contact member support and extending through said casing, a relative-temperature indicating finger positioned on the outside of said casing and shiftable with the end of said adjusting lever, and a knob revolubly mounted at the one end of said casing and connected to said adjusting lever and said indicating finger for shifting the same.

3. In an automatic electric connection plug, a casing, a heat distortable, thermostat member positioned in said casing and provided with a contact member, a contact member support pivotally mounted within said casing and provided with a contact member and adapted to be engaged by and shift said other contact member, an adjusting arm secured to and insulated from said contact member support and extending through the wall of said casing, and knob means revolubly mounted on the end of said casing and connected to the free end of said adjusting lever.

4. In an automatic electric connection plug, a casing, a heat distortable, thermostat member positioned in said casing and provided with a contact member, a contact member support pivotally mounted within said casing and provided with a contact member and adapted to be engaged by and shift said other contact member, an adjusting arm secured to and insulated from said contact member support and extending through the wall of said casing, knob means revolubly mounted on the end of said casing and connected to the free end of said adjusting lever, and an indicating finger secured to said knob means, extending forwardly therefrom and over a portion of said casing.

5. In an automatic electric plug, hollow casing members, a frame member extending over the one end of said casing members, securing the same together at said end, and having arms extending toward the other end of said casing members, means securing the arms of said frame member and said casing members together near the other end, a thermostat member adapted to be warped by heat, positioned between said casing members, a support pivotally mounted between said casing members adapted to be engaged by said thermostat member, an adjusting arm secured to said support and extending through the wall of one of said casing members, and a knob revolubly mounted on said frame member and connected to the free end of said adjusting arm.

6. In an automatic electric plug, hollow casing members, a frame member extending over the one end of said casing members, securing the same together at said end, and having arms extending toward the other end of said casing members, means securing the arms of said frame member and said casing members together near the other end, a thermostat member adapted to be warped by heat, positioned between said casing members, a support pivotally mounted between said casing members adapted to be engaged by said thermostat member, an adjusting arm secured to said support and extending through the wall of one of said casing members, a knob revolubly mounted on said frame member, and a retaining member secured to the inner portion of said knob and provided with stop means adapted to limit the movements of said adjusting lever.

7. In an automatic electric plug, hollow casing members, a frame member extending over the one end of said casing members, securing the same together at said end, and having arms extending toward the other end of said casing members, means securing the arms of said frame member and said casing members together near the other end, a thermostat member adapted to be warped by heat, positioned between said casing members, a support pivotally mounted between said casing members adapted to be engaged by said thermostat member, an adjusting arm secured to said support and extending through the wall of one of said casing members, a knob revolubly mounted on said frame member, a retaining member secured to the inner portion of said knob and provided with stop means adapted to limit the movements of said adjusting lever, and an indicating finger secured to and extending forwardly from said retaining member and shiftable with said knob and the free end of said adjusting lever.

8. In an automatic electric plug, a casing, a plate thermostat member mounted therein at its forward end and free at its rear end, a contact member support pivotally mounted at its one end in said casing adjacent the thermostat member and intermediate the ends thereof and extending backwardly towards the rear end of the casing, an adjusting lever secured to the free end of said contact member support and extending through the one side of said casing, and a knob rotatably mounted over the one end of said casing and pivotally connected with the end of the adjusting lever extending through said casing.

9. In an automatic electric plug, a casing, a plate thermostat member mounted therein at its forward end and free at its rear end, a contact member support pivotally mounted at its one end in said casing adjacent the thermostat member and intermediate the ends thereof and extending backwardly towards the rear end of the casing, an adjusting lever secured to the free end of said contact member support and extending through the one side of said casing, a knob rotatably mounted over the one end of said casing and pivotally connected with the end of the adjusting lever extending through said casing, and a temperature indicating finger secured to said knob and extending forwardly therefrom over a graduated portion at the outer side of said casing.

In testimony whereof, I have hereunto set my hand at San Diego, California, this 13th day of April, 1923.

MARTIN C. BERSTED.